United States Patent
Brightbill et al.

[11] Patent Number: 5,913,568
[45] Date of Patent: Jun. 22, 1999

[54] TWO PLATFORM MOTION SEAT

[76] Inventors: Stephen T. Brightbill, 2323 Barley Dr., Vista, Calif. 92083; David W. Flesner, 3211 Hill St., San Diego, Calif. 92106

[21] Appl. No.: 08/940,921

[22] Filed: Sep. 30, 1997

[51] Int. Cl.⁶ .............................. A47C 3/02; A47D 13/10
[52] U.S. Cl. ...................... 297/258.1; 297/233; 297/312; 297/314
[58] Field of Search ............................. 297/258.1, 260.1, 297/312, 314, 233; 5/109, 609, 653

[56] References Cited

U.S. PATENT DOCUMENTS

| | | | |
|---|---|---|---|
| 135,973 | 2/1873 | Doremus | 297/312 X |
| 270,273 | 1/1883 | Yount | 297/233 |
| 286,457 | 10/1883 | Magoun | 297/233 |
| 1,836,630 | 12/1931 | Thum | 297/312 X |
| 1,976,326 | 10/1934 | Carlton | 297/312 |
| 2,018,721 | 11/1935 | Holtzman | 297/312 X |
| 2,482,996 | 9/1949 | Wisby | 297/312 |
| 2,799,323 | 7/1957 | Berg | 297/312 |
| 3,080,195 | 3/1963 | Berg . | |
| 3,730,590 | 5/1973 | Harris | 297/312 X |
| 3,749,442 | 7/1973 | Berg et al. | 297/312 |
| 3,824,991 | 7/1974 | Whitaker . | |
| 4,047,757 | 9/1977 | Eames et al. . | |
| 4,541,668 | 9/1985 | Rouw | 297/312 X |
| 5,024,485 | 6/1991 | Berg et al. | 297/312 |
| 5,288,127 | 2/1994 | Berg et al. | 297/312 |
| 5,405,187 | 4/1995 | Soderland | 297/312 |
| 5,567,009 | 10/1996 | Fay et al. | 297/258.1 |
| 5,577,801 | 11/1996 | Glöckl | 297/258.1 X |
| 5,588,704 | 12/1996 | Harza | 297/314 |

FOREIGN PATENT DOCUMENTS

| | | | |
|---|---|---|---|
| 351735 | 5/1905 | France | 297/314 |

*Primary Examiner*—Peter M. Cuomo
*Assistant Examiner*—Rodney B. White
*Attorney, Agent, or Firm*—Curtis L. Harrington

[57] ABSTRACT

A seat providing improved comfort includes a pair of moving seating assemblies. A motion mechanism provides each seating assembly with rocking movement and vertical movement. The seating assemblies are provided at a neutral angle that corresponds to the particular application of the seat. The amount of rocking movement and vertical movement is based on the neutral angle. In concert, the neutral angle orientation, rocking movement, and vertical movement cause the weight supported by an occupant's seat bones, posterior, and thighs to be optimally distributed on the seating assembly, improving seating comfort as applied to a given seating environment.

52 Claims, 7 Drawing Sheets

5,913,568

TWO PLATFORM MOTION SEAT

BACKGROUND OF THE INVENTION

1. Field of the Invention

This invention relates generally to a seat, and, more particularly, to a seat with a pair of moving seat platforms.

2. Description of the Related Art

Most seats in the past did not promote occupant movement. Seats that do not promote occupant movement cause the seated occupant to sit in a constrained or static posture. This can lead to a number of health-related problems. For example, constrained occupant seating postures can cause joint impairments (arthritis), inflamed tendon sheaths (tendinitis, peritendinitis), chronic joint degeneration (arthroses), and muscle pain (e.g., when the occupant shifts weight on the seat bones, from side to side, or leans to one side, the occupant stresses his or her back muscles to remain adequately supported on the seat).

Prolonged static seating has also been linked to back problems because of the prolonged static pressure on the spine. Prolonged static pressure on the spine impairs fluid flow from the discs, impairing glucose transport, disc nutrition, and the elimination of waste products.

Constrained occupant postures also cause poor circulation. Edema of the lower legs is commonly induced by lack of movement. Leg edema is problematic because local pooling of the blood increases venous pressures to the heart, blood pressure, and heart rate. Edema may predispose the occupant to varicose veins, hemorrhoids, and other peripheral venous disorders such as cold feet. Another circulation problem resulting from seats that do not promote occupant movement is deep venous thrombosis caused by the formation of venous clots in the legs. These blood clot formations occur from sitting in a static position for long periods of time. Other circulation problems occur when certain parts of the occupant's posterior or legs experience greater pressure than the other seated portions of the occupant. This occurs when a portion of the seat, especially the front, digs into the posterior or legs of the occupant, or if the occupant leans more towards one side of the seat than the other. These concentrated forces on the legs and posterior inhibit circulation and lead to discomfort.

Some seats have been designed to promote occupant movement and improve the comfort of the seated occupant. Some of these seats include a pair of seat platforms that move independently of each other. Each seat platform rocks in a see-saw manner on a fulcrum. In one of these seats, the fulcrum also allows vertical movement of the seat platform as the seat platform slides backwards and forwards. The independent seat platforms are designed to be self aligning, and allow the posterior of the occupant to move normally and independently without restraint, improving seat comfort.

The problem with these seats is that they are not comfortable for multiple seating applications and environments (e.g., office, home, automobile, etc.). In most seating environments, these seats do not properly distribute the weight of the body being borne by the ischial tuberosities ("seat bones") and the residual weight of the posterior and thigh over the two seating platforms during different seat positions (e.g., one leg up, both legs up, both legs down, legs crossed, etc.). This causes discomfort and circulation problems. Also, in most seating environments, the seats did not allow the exercise necessary for the muscles, tendons, and ligaments of the lower back, pelvis, and thigh areas. This leads to circulation problems, flexibility problems, and back problems.

SUMMARY

An object of the present invention is to overcome the above-described difficulties of static seating.

An aspect of the present invention involves the recognition that in a seat with a pair of moving seat assemblies, optimal seating comfort is achieved by providing the seat assemblies at a predetermined neutral angle appropriate for the particular application of the seat. The neutral angle is defined as the angle, relative to horizontal, at which the seat assemblies are initially oriented before external forces are applied to the seat. It is further recognized that each seat assembly should rock and move vertically up to a predetermined amount corresponding to the neutral angle.

Another aspect of the present invention involves four additional recognitions. First, in greater positive neutral angle seating applications (leaned-back seating), the amount of rocking and vertical movement should be greater. Second, in smaller positive neutral angle seating applications, the amount of rocking and vertical movement should be smaller. Third, in greater negative neutral angle seating applications (leaned-forward seating), the amount of rocking movement should be greater, but the amount of vertical movement should be smaller. Finally, in smaller negative neutral angle seating applications, the amount of rocking and vertical movement should be smaller.

An additional aspect of the present invention involves a seat with a pair of moving seat assemblies. A motion mechanism allows vertical motion and rocking motion in each seat assembly. The seat assembly is provided at a neutral angle based on the application of the seat. The total amount of rocking motion and vertical motion allowed depends on the neutral angle of the seat assembly. This combination causes the weight of a seated occupant borne by the ischial tuberosities and the residual weight of the posterior and thighs to be distributed optimally over the two seating assemblies, regardless of the occupant's seated position. The combination also allows the muscles, tendons, and ligaments of the lower back, pelvic, and thigh areas to be exercised, improving fluid flow (e.g., blood circulation), alertness, flexibility, and inhibiting back pain.

BRIEF DESCRIPTION OF THE DRAWINGS

These and other features of the invention will now be described with reference to the drawings which are intended to illustrate and are not to limit the invention, and in which.

DETAILED DESCRIPTION

Figures 1, 3:
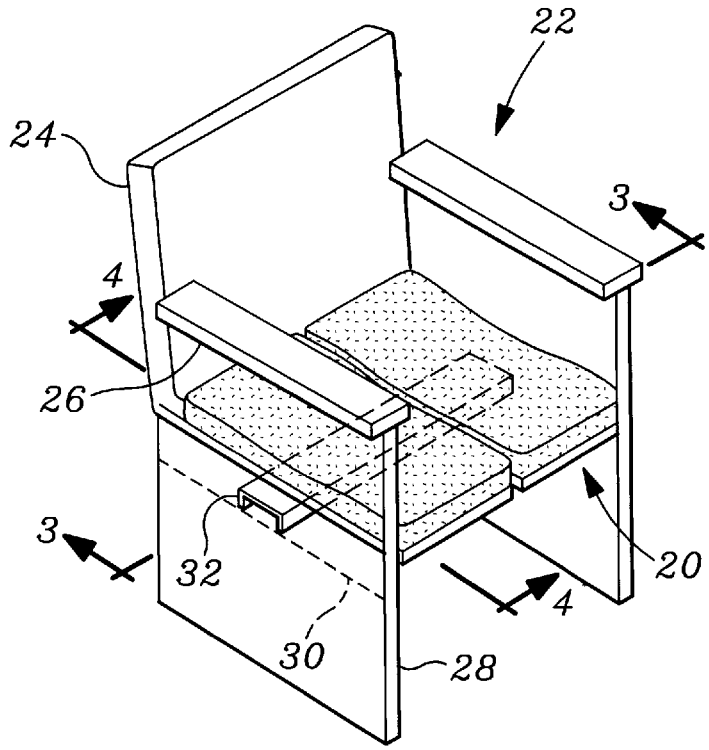
FIG. 1 is a perspective view of an office chair with an embodiment of the two platform motion seat of the present invention incorporated therein.
FIG. 3 is a cross-sectional view of the two platform motion seat of FIG. 1, taken along line 3—3 of FIG. 1.

With reference to FIG. 1, a two platform motion seat 20 constructed in accordance with an embodiment of the invention is shown incorporated into an office chair 22. The chair 22 includes a back 24, arms 26, and legs 28. On opposite sides of the chair 22, an apron 30 connects an upper part of the legs 28. A support or foundation 32 extends laterally across the chair 22 and is supported by the aprons 30. The two platform motion seat 20 is supported by the lateral support 32.

Although the two platform motion seat 20 is shown and described in conjunction with an office chair 22, it will be readily understood by the reader that an office chair is just one of the many seating applications or environments that the two platform motion seat of the present invention may be incorporated into. For example, but not by way of limitation, the two platform motion seat of the present invention may also be incorporated into the following types of seats: task (e.g., assembly line seating), auto, light trucks, long-haul trucking, military vehicles, heavy equipment, tractors, auditorium, theater, stadium, institutional, formal, leisure, dining furniture, motion (e.g., recliners), rocking, stationary furniture (e.g., dining room chairs), folding chairs, stacking chairs, airline, bus, train, motorcycles, golf carts, wheelchair, exercise devices, stools, sit/stand chairs, and handheld, after-market portable seats.

In addition, the seat that the two platform motion seat 20 is incorporated into may include, but not by way of limitation, any of the following improvements that are not shown: headrests, armrests, legrests, manual or power adjustment mechanisms, heating/cooling devices, and vibration/massage mechanisms. For example, the two platform motion seat may include any of the manual user adjustment mechanisms (e.g., seat height control mechanism, tilt control mechanism, etc.) found on many modern chairs.

Figure 2:
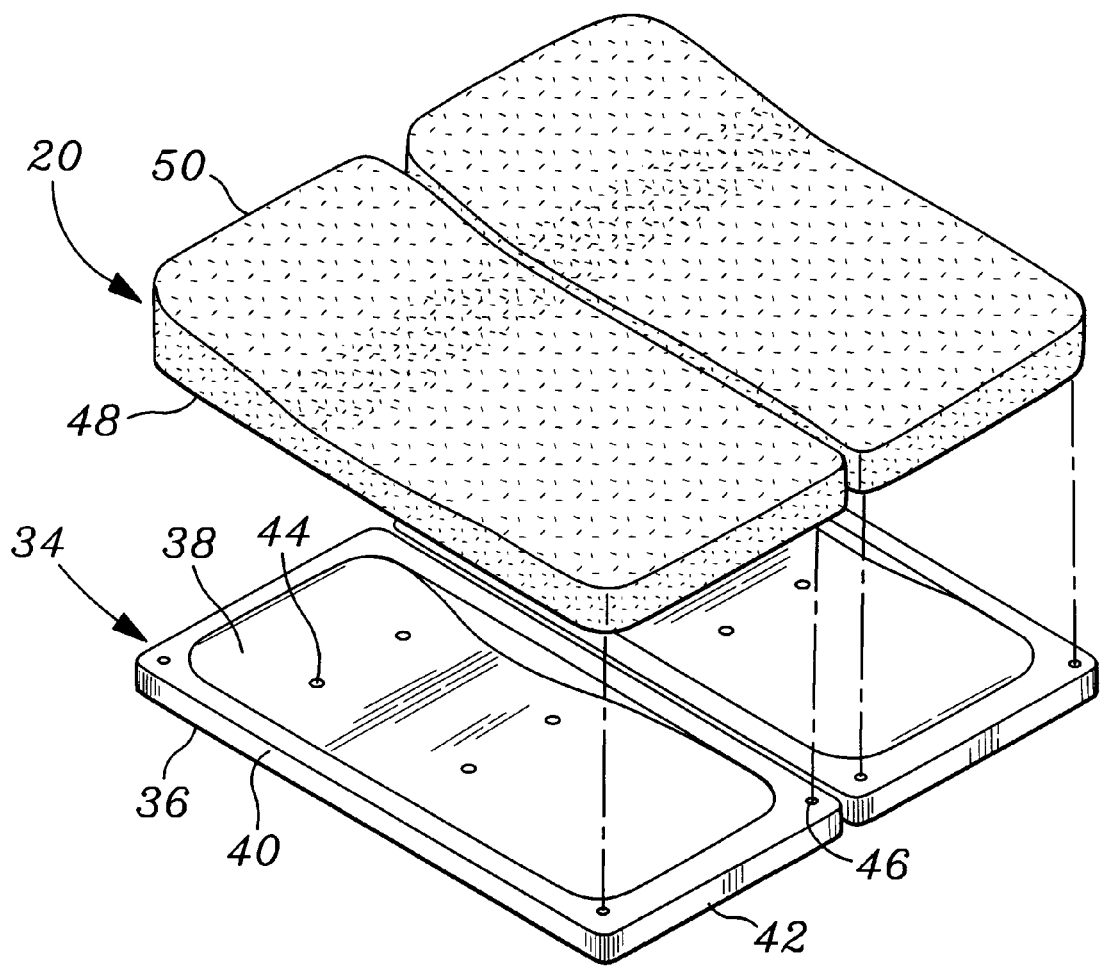
FIG. 2 is an exploded view of an embodiment of the seat assemblies of the two platform motion seat of the present invention.

With reference to FIG. 2, the two platform motion seat 20 includes a pair of adjacent seat assemblies 34. Each seat assembly 34 has a seat platform or body 36, which may be made of metal, plastic, a frame with webbing, or an inflatable device. The seat body 36 may have a generally rectangular shape and includes a main body 38 and a periphery 40. The main body 38 may have contouring of any shape for additional seating comfort. The periphery 40 may include a flanged portion 42. The seat body 36 may include a set of holes 44 in the main body 38 and a set of holes 46 in the periphery 40.

Although not shown, the seat body 36 may be subdivided into two or more subsections, laterally or longitudinally. The subsections of the seat assemblies 34 may rock and move vertically in the manner described more fully below. Subdividing the seat body 36, especially subdividing the seat body 36 into movable subsections, makes the seat body 36 more responsive to the movements of the seated occupant.

Each seating assembly 34 may include a cushioning material 48 and/or an outer upholstery covering 50. The cushioning material 48 and upholstery 50 may be attached onto the seat body 36 with threaded fasteners (not shown), which fit through the periphery holes 46, or with any other suitable fastening means such as glue. The cushioning material 48 and/or upholstery 50 may be contoured for additional seating comfort. It should be noted, in certain seating applications (e.g., outdoor stadium seating), the cushioning material 48 and/or upholstery 50 might not be added.

With reference to FIGS. 3–7, the seating assemblies 34 preferably move independently of each other through at least one motion mechanism, which is represented symbolically as MM in order for the reader to better understand the motion and orientation provided in the two platform motion seat of the present invention. Although one motion mechanism MM is preferably provided for each seating assembly 34, a single motion mechanism MM may be provided for both seating assemblies, or multiple motion mechanisms MM may be provided for each seating assembly 34. The motion mechanism MM provides the seating assembly 34 with vertical motion and rocking motion. A number of embodiments of the motion mechanism MM are shown in FIGS. 11–19 and described below. Although these embodiments of the motion mechanism MM include different types of spring arrangements, it will be readily understood by the reader that other types of motion mechanisms MM may be used, such as, but not by way of limitation, pneumatic mechanisms (e.g., air bladder), hydraulic mechanisms, magnetic mechanisms, or motorized mechanisms (in conjunction with sensor arrangement, control circuit, and/or computer). It should also be noted that the seating assemblies 34 do not have to move completely independently of each other; the movement of the seating assemblies may be interrelated.

Figure 4:
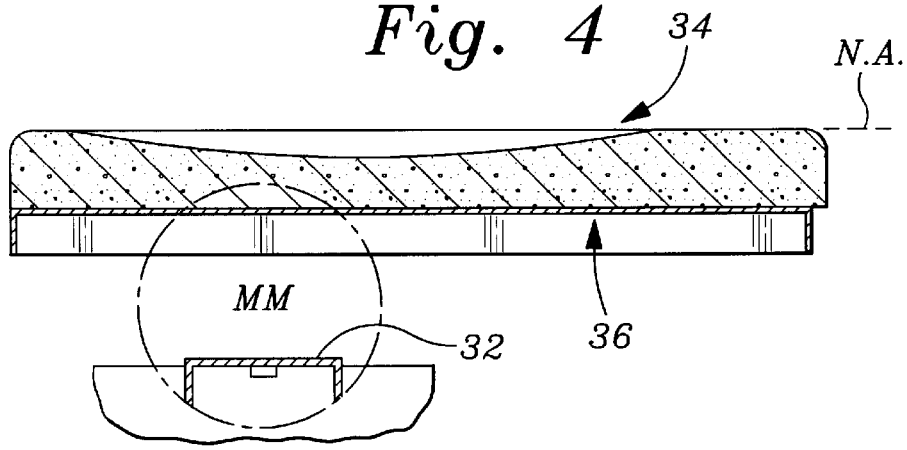
FIG. 4 is a cross-sectional view of the two platform motion seat of FIG. 1, taken along line 4—4 of FIG. 1, and shows the motion mechanism (MM) symbolically and the seat assembly.
Figure 5:
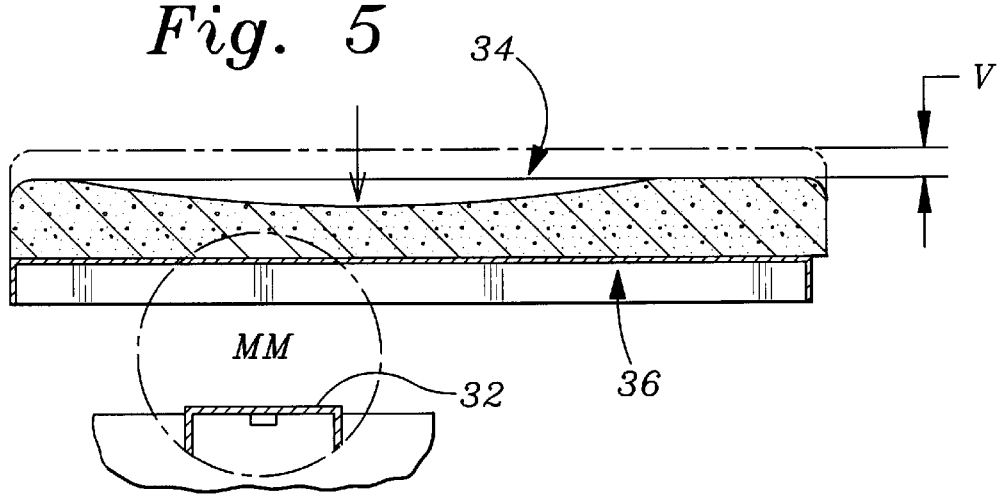
FIG. 5 is a cross-sectional view, similar to FIG. 4, and shows the vertical movement capability of the seat assembly.

With reference to FIGS. 3–5, the vertical or up-and-down motion of the seat assembly 34 will now be described. When seated, an occupant sits generally upon his or her ischial tuberosities or seat bones. The weight of the occupant generally creates a pair of respective resultant forces R.S., L.S. on the seat assemblies 34. Each motion mechanism MM allows its seat assembly 34 to travel downwards a respective distance V (FIG. 5) corresponding to the magnitude of the force R.S., L.S. on it. When the force R.S., L.S. is removed from the seat assembly 34, the motion mechanism MM causes the seat assembly 34 to rise vertically to its original position (FIG. 4).

In traditional seats that do not have independent moving seat halves, when the occupant shifts weight on the seat bones, from side to side, or leans to one side, the occupant stresses his or her back muscles to remain adequately supported on the seat. Not only does this cause discomfort in the lower back, but the concentrated load on the side of the posterior that the occupant is leaning to causes discomfort.

The motion mechanism MM provides the seat assemblies 34 with the independent vertical motion the pelvis requires to accommodate shifting weight on the seat bones, from side to side, and maintain a balanced weight distribution between the two seat bones. This allows the pelvis to perform its role as the "fulcrum of the body" while seated, just as it does while standing, walking, or running. When standing, walking, or running, the pelvis serves as a balance or pivot point for the upper body, adjusting when the occupant shifts weight from side to side. In traditional seats, the pelvis is restricted from functioning as a balance or pivot point. Consequently, the weight of the upper and lower body is not balanced properly on the seat. The motion mechanism MM provides enough movement to allow the pelvis to function effectively as a pivot point. This provides proper weight distribution for the occupant's upper and lower body, leading to the proper adjustment of the spine, and allowing the occupant to be better supported on the seat. This inhibits lower back pain because the back muscles are not stressed to maintain balance and helps reduce the aforementioned concentrated loads on one side of the posterior.

The inventors have determined that this vertical distance V should range from approximately 0.1 in. to 4.0 in., depending on the neutral angle, which will be described in more detail below, and the particular seating application. If the amount of vertical movement is less than approximately 0.1 in., the inventors have determined that the seating assembly 34 would provide insufficient movement to the pelvic bones to allow for proper adjustment of the spine and maintain a balanced weight distribution between the two ischial tuberosities. Also, if the amount of up-down motion is too small the seat will feel too hard, creating too much static pressure on the ischial tuberosities. If the amount of vertical movement is greater than approximately 4.0 in., the seating assembly 34 can result in unstable postures and/or the creation of additional stress on the muscles to maintain balance. While approximately 0.1 to 4.0 in. is believed to be the desired range of movement. At least about 0.8 in. is more preferable for numerous applications because it prevents the seat from feeling too hard and allows for a more stable posture.

Figure 6:
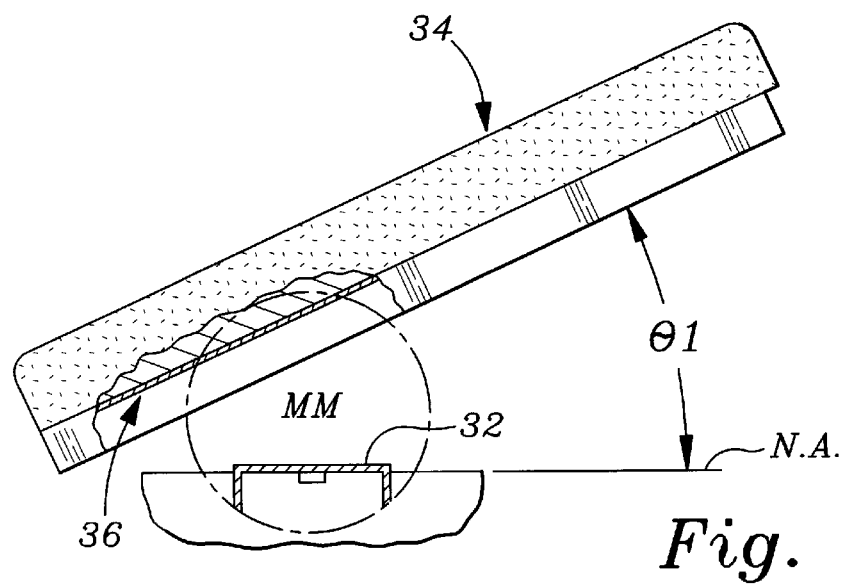
FIG. 6 is a cross-sectional view, similar to FIGS. 4 and 5, and shows the rocking capability of the seat assembly through a positive angle ($\theta_1$)
Figure 7:
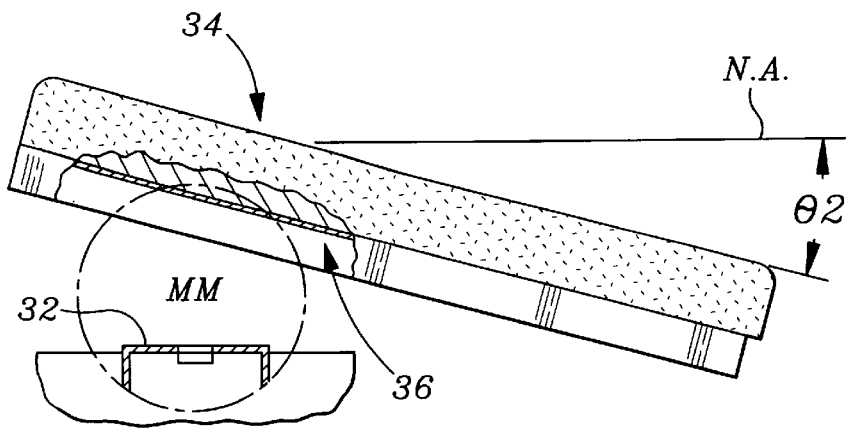
FIG. 7 is a cross-sectional view, similar to FIGS. 4–6, and shows the rocking capability of the seat assembly through a negative angle ($\theta_2$)

FIGS. 6 and 7 illustrate the rocking or see-saw motion of the seat assembly 34. When an occupant sits on the seat assemblies 34, the occupant's location on the seat assemblies 34 and his or her seating posture will cause each seat assembly 34 to rock to a rocking angle θ through the motion mechanism MM. The rocking angle θ is the angle that the seat assembly rocks through, relative to the initial, unburdened orientation or neutral angle disposition NA of the seat. For rocking angle θ calculation purposes, the neutral angle disposition NA of the seat is considered to be the origin or 0°. Although in FIGS. 3–7 the neutral angle disposition NA is horizontal, it will become better understood below that the neutral angle disposition NA varies, depending on the particular application of the seat 20.

The independent rocking motion of the seat assemblies 34 provided by the motion mechanism MM allows each seat assembly 34 to move in the above-described rocking manner with the movements of the occupant, optimally distributing the weight of the occupant over the seat assemblies 34 so as to inhibit discomfort and/or circulation problems. The rocking movement causes exercising of the muscles, tendons, and ligaments in the lower back, pelvic, and thigh areas by causing movement in these areas of the body. This promotes circulation, feeding nutrients, eliminating waste metabolites, and inhibiting leg swelling (edema), blood clotting, and other peripheral venous disorders. This exercise also feeds inter-vertebral discs through passive changes in osmosis. Movement-induced changes of pressure "feed" inter-vertebral discs nutrients and eliminate waste products by passive diffusion. This enhances the cushion effect the discs have on the occupant's vertebrae, reducing back problems caused by sitting. The movement also increases occupant alertness as afferent nerves send impulses to the central nervous system. Occupant comfort is also increased because the seat movement constantly redistributes pressures acting on the spine, joints, and tissue.

The seat assembly 34 of FIG. 6 is shown at a rocked back angle $\theta_1 (\theta>0°)$. The seat assembly 34 of FIG. 7 is shown at a rocked-forward angle $\theta_2$ ($\theta<0°$). When the occupant leaves the seating assemblies 34, each motion mechanism MM causes its seat assembly 34 to return to its initial, unburdened orientation (FIG. 4).

The inventors have determined that preferably the total rocking angle or amount of total rock that the seat assembly 34 can be rocked through is approximately 60° (from an extreme rocked-backward position to an extreme rocked-forward position). If the amount of total rock is too small, the inventors believe the occupant will not receive sufficient exercise and range of motion in the pelvic and thigh areas to provide the benefits of enhanced circulation, flexibility, and alertness. If the amount of total rock is greater than approximately 600, the inventors believe the occupant will be placed in unstable postures and this will produce additional stress on the muscles to maintain balance.

Figure 8:
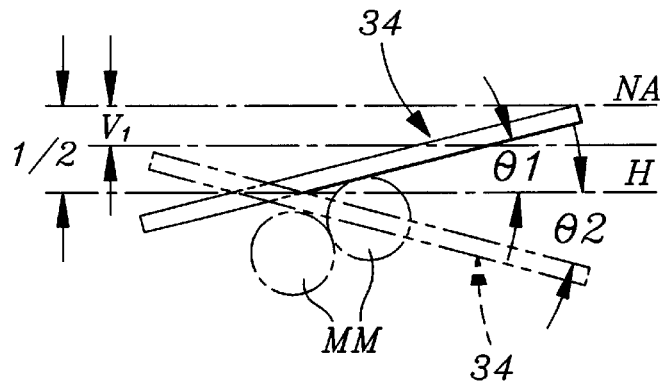
FIG. 8 is a symbolic representation of the motion mechanism MM and the seat assemblies, and shows the seat assemblies at different rocking angles ($\theta_1$, $\theta_2$) and with different amounts of vertical movement ($V_1$, $V_2$)

With reference to FIG. 8, although the vertical motion and rocking motion provided by the motion mechanism MM have been described separately, in actuality, these two motions are provided simultaneously by the motion mechanism MM. The seating assemblies 34 are shown with different vertical movements $V_1$, $V_2$, and different rocking angles $\theta_1$, $\theta_2$, respectively. The seat assemblies 34 might take this disposition when an occupant crosses his or her legs.

Figure 9A:
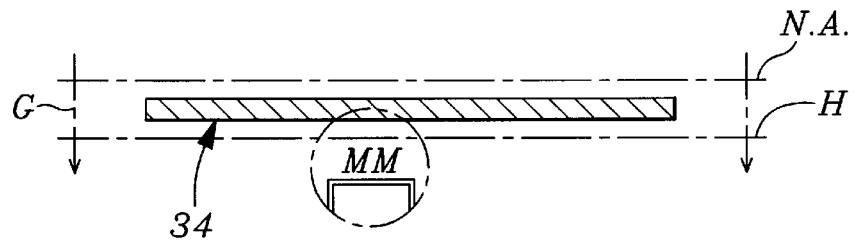
FIGS. 9A–9C are symbolic representations of the motion mechanism MM and the seat assembly, and show the seat assembly at various neutral angles ($\alpha$)
Figure 9B:
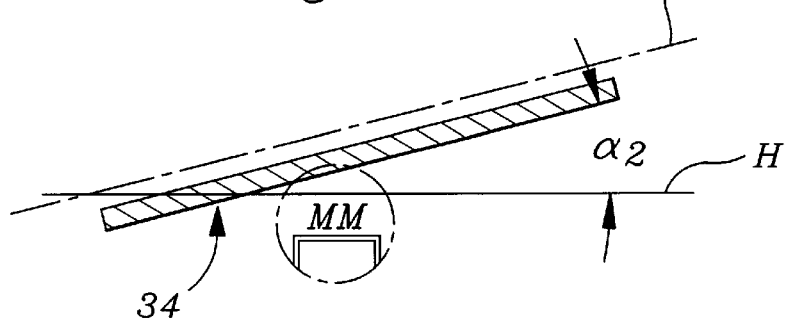
Figure 9C:
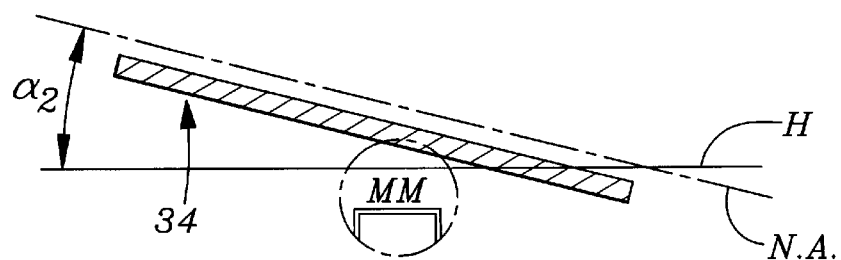

With reference to FIGS. 9A–9C, the inventors have recognized that to realize the aforementioned benefits from vertical motion and rocking motion in a two platform motion seat, which have not been achieved in a moving two platform seat for most seating applications in the past, each seating assembly 34 must be provided at a neutral angle α appropriate for the particular seating application or environment that the two platform motion seat 20 is incorporated into. The inventors have further recognized that the amount of rocking motion and vertical motion provided by the motion mechanism MM should depend on this neutral angle α.

Figure 10A:
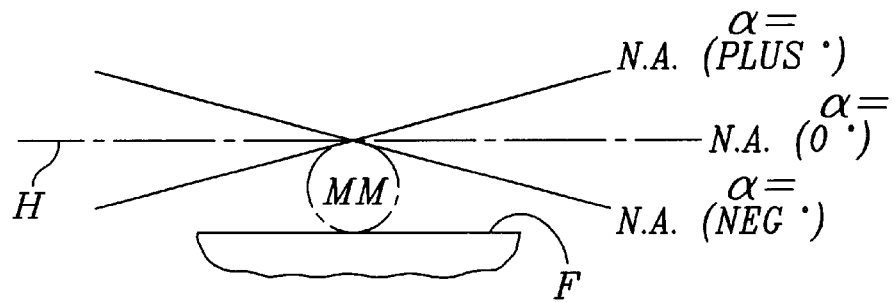
FIGS. 10A–10C are symbolic representations of the motion mechanism MM and the seat assembly, and show the seat assembly at various neutral angles and the foundation F at various angles.
Figure 10B:
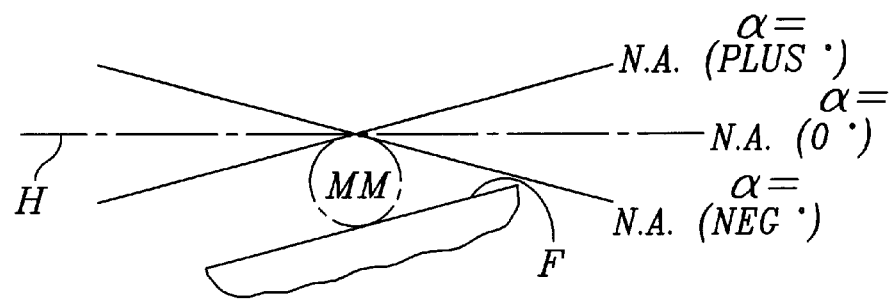
Figure 10C:
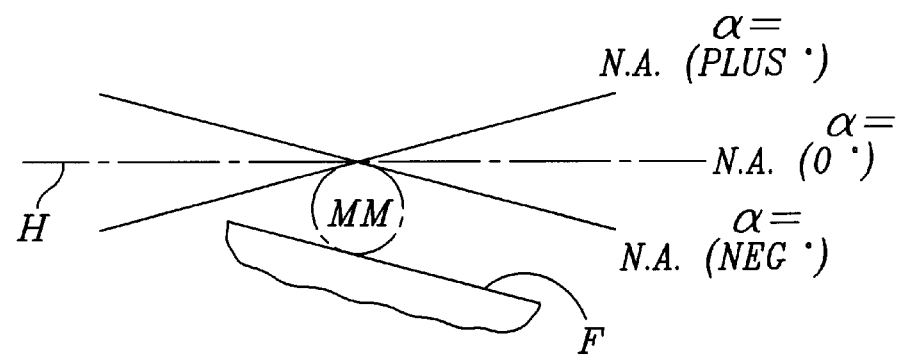

The neutral angle α is the absolute angle between the neutral angle disposition or line NA and an imaginary horizontal line H that resides at 0°. The neutral angle α is the angle that the seating assembly 34 initially is oriented at before any external forces, such as the weight of the occupant, are applied to the seat 20. The horizontal line H is orthogonal to earth's gravity force vectors G (FIG. 9A). Consequently, as illustrated in FIGS. 10A–10C, the orientation of the support 32 or foundation F is irrelevant in determining the neutral angle α because the neutral angle α is an absolute angle relative to the horizontal line H.

It will be apparent to one skilled in the art that the neutral angle disposition NA of the seating assemblies 34 may be provided in numerous ways such as, but not by way of limitation, altering the angle of the foundation or support 32, altering the connection of the motion mechanism MM with the foundation or with the bottom of the seat body 36, changing the construction or configuration of the motion mechanism MM, etc.

FIG. 9B illustrates the seating assembly 34 with a positive neutral angle $\alpha_1$ ($\alpha>0°$). The inventors refer to seating applications with a positive neutral angle as leaned-back seating applications because the occupant predominantly sits in a leaned-back manner. FIG. 9C illustrates the seat assembly 34 with a negative neutral angle $\alpha_2$. The inventors refer to seating applications with a negative neutral angle as leaned-forward seating applications because the occupant predominantly sits in a leaned-forward manner.

The inventors have determined that, in general, the neutral angle $\alpha$ should vary from approximately negative 40° to approximately positive 30°. In some seating applications, the neutral angle $\alpha$ may exceed these parameters. For example, in a sit-stand chair, the neutral angle $\alpha$ may exceed approximately negative 40° (e.g. negative 45°, 50°, etc.). In more modern, super reclining office chairs, the neutral angle $\alpha$ may sometimes exceed approximately positive 30° (e.g. positive 35°, 40°, etc.). In most seating applications, if the neutral angle $\alpha$ exceeds approximately negative 40°, the occupant would not be able to derive sufficient benefit from the vertical movement in the seat because the majority of the occupant's weight would be on his/her legs rather than on the ischial tuberosities. Similarly, in most seating applications, if the neutral angle $\alpha$ exceeds approximately positive 30°, the occupant would not be able to derive sufficient benefit from the movement in the seat because the majority of the occupant's weight would be on his/her back rather than on the ischial tuberosities.

The varying of the neutral angle $\alpha$ for the two main types of seating applications, leaned-back seating (positive neutral angle seating) and leaned-forward seating (negative neutral angle seating) are described below.

It should be noted, although two main types of seating are described, in some seating applications, such as office seating, a seat may be adjustable so as to provide a positive neutral angle $\alpha_1$ and a negative neutral angle $\alpha_2$. This may be done with an adjustment mechanism (not shown) provided along the side of the seating assemblies 34, below the seating assemblies 34, etc., to vary the neutral angle $\alpha$ of the seat between a positive neutral angle $\alpha_1$ and negative neutral angle $\alpha_2$, including various positions therebetween.

Positive Neutral Angle Seating Applications

Positive neutral angle or leaned-back seating applications generally consists of three different types: 1) minimum neutral angle ($\alpha$=0 to 4°); 2) moderate neutral angle ($\alpha$=0 to 15°); and 3) maximum neutral angle ($\alpha$=0 to 30°).

The inventors have determined that the greater the neutral angle seating (i.e., moderate to maximum neutral angles), the greater the rocking movement and vertical movement should be in the seat assemblies 34 (It should be noted, the inventors have also determined the rocking movement and vertical movement should be relatively increased as cushion thickness increases). In this type of seating, the occupant is more reclined in the seat. This means less of the occupant's seated upper body weight is directed vertically downward on the spine and ischial tuberosities compared to minimum neutral angle seating where the occupant is essentially sitting vertically. Because of the smaller amount of stress on the spine and ischial tuberosities at this orientation, more movement, both vertical and rocking, is required in the seat assemblies 34 for the occupant to experience stress relief in the normally-affected areas of the body.

The inventors have determined that the smaller the neutral angle seating (i.e., minimum to moderate neutral angles), the smaller the rocking movement and vertical movement should be in the seat assemblies 34. In this type of seating, the occupant is sitting essentially upright. Thus, more of the occupant's upper body weight is directed vertically downward on the spine and ischial tuberosities. This greater stress means that only relatively small amounts of vertical and rocking movement are required for the occupant to feel stress relief in the normally-affected areas of the body.

The following identifies the desired parameters for rocking motion and vertical motion in the seat assemblies 34 for the different types of leaned-back seating applications:

1) Minimum Neutral Angle

In minimum neutral angle seating, the neutral angle $\alpha$ is relatively small ($\alpha$=0 to 4°). Examples of this type of seating include, but not by way of limitation, office chair seating and task chair seating. Based on the above neutral angle range, the amount of total rock should be between approximately 5 and 10 degrees. If the amount of total rock is greater than approximately 10 degrees, the inventors believe the seating assemblies 34 will not adequately support the occupant, possibly resulting in an unstable posture that may produce additional stress on the muscles to maintain balance. If the amount of total rock is less than approximately 5 degrees, the inventors believe the occupant will not receive sufficient exercise and range of motion in the pelvic and thigh areas to provide the benefits of enhanced circulation, flexibility, and alertness. Based on this neutral angle range, the amount of vertical movement should be approximately 0.10–1.5 in. If the amount of vertical movement is less than approximately 0.10 in., the seat may feel too hard, creating too much static pressure on the ischial tuberosities, and likely provides insufficient movement to the pelvic bones to allow for proper adjustment of the spine, or to maintain a balanced weight distribution between the two ischial tuberosities. If the amount of vertical movement is greater than approximately 1.5 in., the seat may not feel like it is providing adequate support. This may result in unstable postures and/or the creation of additional stress on the muscles to maintain balance.

2) Moderate Neutral Angle

In moderate neutral angle seating, the neutral angle $\alpha$ is small to moderate ($\alpha$=0 to 15°). Examples of this type of seating include, but not by way of limitation, motor vehicle seating such as automobile seating. Based on the above neutral angle range, the amount of total rock should be between approximately 3 and 20 degrees. If the amount of total rock is greater than approximately 20 degrees, the inventors believe the seating assemblies 34 will not adequately support the occupant, possibly resulting in an unstable posture that may produce additional stress on the muscles to maintain balance. If the amount of total rock is less than approximately 3 degrees, the inventors believe the occupant will not receive sufficient exercise and range of motion in the pelvic and thigh areas to provide the benefits of enhanced circulation, flexibility, and alertness. Based on this neutral angle range, the amount of vertical movement should be approximately 0.25–2.0 in. If the amount of vertical movement is less than approximately 0.25 in., the seat may feel too hard, creating too much static pressure on the ischial tuberosities, and likely provides insufficient movement to the pelvic bones to allow for proper adjustment of the spine and to maintain a balanced weight distribution between the two ischial tuberosities. If the amount of vertical movement is greater than approximately 2.0 in., the seat will not feel like it is providing adequate support. This may result in unstable postures and/or the creation of additional stress on the muscles to maintain balance.

In seating applications such as automobile seating, where the occupant may be sitting in one position for a long period of time, motion in the seat is especially important to inhibit the formation of venous clots in the legs (i.e., deep venous thrombosis). These blood clot formations occur more frequently in people with poor circulation (e.g., the elderly) who sit in a static position for long periods of time. Deep venous thrombosis is a serious problem because if the clot breaks off and travels through the circulatory system it can lead to greater problems such as a pulmonary embolism. Varying the neutral angle with the particular seating application, and providing the rocking motion and vertical motion parameters indicated above passively exercises the normally-affected seating areas of the occupant, improving circulation and reducing the risk of deep venous thrombosis.

3) Maximum Neutral Angle

In maximum neutral angle seating, the neutral angle $\alpha$ ranges from small to large ($\alpha=0$ to $30°$). Examples of this type of seating include, but not by way of limitation, recliner, theater, and airline seating. Based on the above neutral angle range, the amount of total rock should be between approximately 10 and 60 degrees. If the amount of total rock is greater than approximately 60 degrees, the inventors believe the seating assemblies 34 will not adequately support the occupant, possibly resulting in an unstable posture that may produce additional stress on the muscles to maintain balance. If the amount of total rock is less than approximately 10 degrees, the inventors believe the occupant will not receive sufficient exercise and range of motion in the pelvic and thigh areas to provide the benefits of enhanced circulation, flexibility, and alertness. Based on this neutral angle range, the amount of vertical movement should be approximately 0.5–4.0 in. If the amount of vertical movement is less than approximately 0.5 in., the seat may feel too hard, creating too much static pressure on the ischial tuberosities, and likely provides insufficient movement for the pelvic bones to allow for proper adjustment of the spine and to maintain a balanced weight distribution between the two ischial tuberosities. If the amount of vertical movement is greater than approximately 4.0 in., the seat will not feel like it is providing adequate support. This may result in unstable postures and/or the creation of additional stress on the muscles to maintain balance.

Negative Neutral Angle Seating Applications

Negative neutral angle or leaned-forward seating applications generally consist of moderate neutral angle to maximum neutral angle seating ($\alpha=0$ to $-40°$).

The inventors have determined that the larger the negative neutral angle seating (i.e., moderate to maximum negative neutral angles), the greater the rocking movement required, but the smaller the amount of vertical movement required. At moderate to maximum negative neutral angles, the legs of the occupant relieve more of the stress on the ischial tuberosities (i.e., receive a larger portion of the gravitation force) and provide some of the vertical movement required. Thus, less vertical movement is needed in the seating assemblies 34. Relatively large rocking motions are required to ensure the weight on the posterior is optimally distributed over the seating assemblies, and the muscles, tendons, and ligaments of the occupant are passively exercised. The smaller the negative neutral angle seating (minimum to moderate negative neutral angles), similar to positive neutral angle seating above, the smaller the amount of rocking motion and vertical motion required.

Moderate to Maximum Negative Neutral Angle

In moderate to maximum negative neutral angle seating, the neutral angle $\alpha$ ranges from small to large ($\alpha=0$ to $-40°$). Examples of this type of seating include, but not by way of limitation, sit-stand chair seating. Based on the above neutral angle range, the amount of total rock should be between approximately 10 and 60 degrees. If the amount of total rock is greater than approximately 60 degrees, the inventors believe the seating assemblies 34 will not adequately support the occupant, either barely or not supporting the occupant, or creating an unstable posture that may produce additional stress on the muscles to maintain balance. If the amount of total rock is less than approximately 10 degrees, the inventors believe the occupant will not receive sufficient exercise and range of motion in the pelvic and thigh areas to provide the benefits of enhanced circulation, flexibility, and alertness. Based on this neutral angle range, the amount of vertical movement should be approximately 0.1–1.5 in. If the amount of vertical movement is less than approximately 0.1 in., the seat may feel too hard, creating too much static pressure on the ischial tuberosities, and likely provides insufficient movement to the pelvic bones to allow for proper adjustment of the spine and to maintain a balanced weight distribution between the two ischial tuberosities. If the amount of vertical movement is greater than approximately 1.5 in., the seat will not feel like it is providing adequate support. This may result in unstable postures and/or the creation of additional stress on the muscles to maintain balance.

Providing the seating assemblies 34 at a specific neutral angle $\alpha$ based on the particular seating application and providing a specific amount of vertical motion and rocking motion based on the specific neutral angle $\alpha$ produces a dynamic seating surface that is specifically designed for each individual seating application. The specific neutral angle $\alpha$ of the seating assemblies properly orients the occupant so that he or she can take full advantage of the aforementioned benefits provided by the two types of motion in the seating assemblies 34.

The vertical motion along with the rocking motion provides the independent motion the pelvis requires to accommodate shifting weight on the ischial tuberosities, from buttock to buttock. This allows the pelvis to perform its role as the "fulcrum of the body" while seated, just as it does while standing, walking, or running. Combined, these motions serve to distribute the weight of the body being borne by the ischial tuberosities and the residual weight of the posterior and thighs optimally over the two seating surfaces, regardless of the position one is sitting in (one leg up, one leg down, both legs up, both legs down, legs crossed, etc.). These motions also cause exercising of the muscles, tendons, and ligaments in the lower back, pelvic, and thigh areas by causing muscle pumping action in these areas of the body. This promotes circulation, feeding nutrients, eliminating waste metabolites, and inhibiting leg swelling (edema), blood clotting, and other peripheral venous disorders. The movement also increases occupant alertness as afferent nerves send impulses to the central nervous system. Occupant comfort is also increased because the seat movement constantly redistributes pressures acting on the spine, joints, and tissue. The rocking motion also eliminates restricted circulation problems caused by a portion of the seating surface, especially the front edge, cutting into the posterior or thighs of the occupant.

With reference to FIGS. 11–19, numerous embodiments of the motion mechanism of the present invention will now be described. These motion mechanisms are preferably made of steel, plastic, or similar material. Where appropriate, like reference numbers with an "a," "b," "c," etc. suffix have been used to indicate like parts previously described for ease of understanding.

Figure 11:
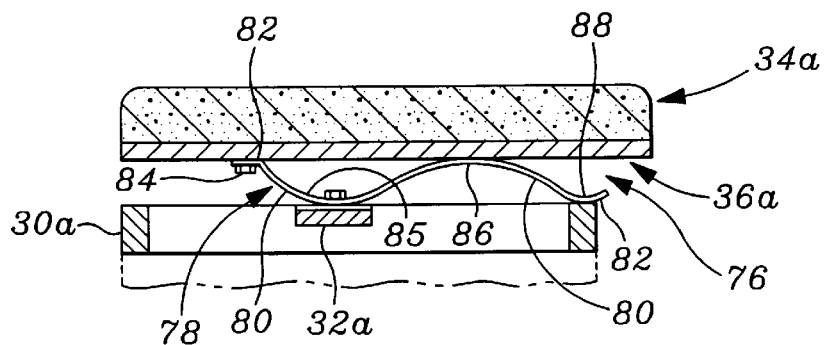
FIGS. 11–19 show alternative embodiments of the motion mechanism of the present invention.

With reference to FIG. 11, an embodiment of a motion mechanism 76 is disclosed. The motion mechanism 76 includes a spring 78 with a wave-like shape. The wave-like spring 78 includes a first crest portion 80 with a flange 82. The flange 82 includes a threaded fastener 84 for attaching the spring 78 to the seat body 36a of the seat assembly 34a. The spring 78 includes a first trough portion 85 that rests upon the lateral support 32a. The first trough portion 85 is attached to the support 32a with a threaded fastener. The wave-like spring 78 also includes a second crest portion 86, which supports another area of the seat body 36a and a second trough portion 88 that rests upon one of the aforementioned aprons 30a.

Figure 12:
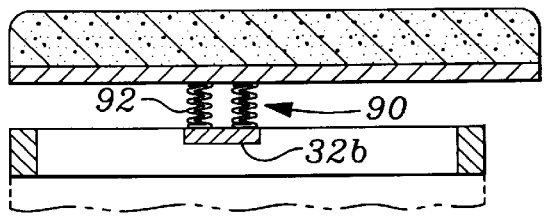

With reference to FIG. 12, a motion mechanism 90 constructed in accordance with an additional embodiment of the invention is shown. The motion mechanism 90 includes a pair of helical springs 92 that rest upon the lateral support 32b. The springs 92 may be varied by size or type to obtain the desired amount of rocking and vertical motion.

Figure 13:
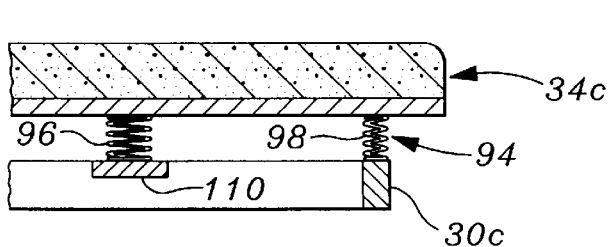

With reference to FIG. 13, a motion mechanism 94 constructed in accordance with an additional embodiment of the invention is shown. The motion mechanism 94 includes first and second springs 96, 98, respectively. The first spring 96 rests upon a rigid base 110 and supports a rearward portion of the seating assembly 34c. The second spring 98 rests upon the apron 30c and supports a forward portion of the seat assembly 34c. As mentioned above, the size and types of the springs 96, 98 may be varied to obtain the desired amount of rocking and vertical motion.

Figure 14:
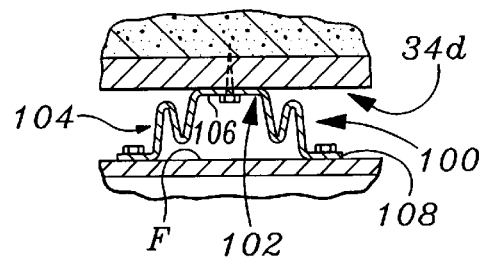

With reference to FIG. 14, a motion mechanism 100 constructed in accordance with an additional embodiment of the invention is shown. The motion mechanism 100 includes a main body portion 102 and a pair of leg portions 104. The main body portion 102 includes a flat plate 106 that supports the seat assembly 34d. The flat plate 106 of the motion mechanism 100 is attached to the seat assembly 34d with a threaded fastener or similar fastening means. The leg portions 104 have a sinusoidal-like shape and terminate in respective flanges 108. The flanges 108 are connected to a foundation F with threaded fasteners.

Figure 15:
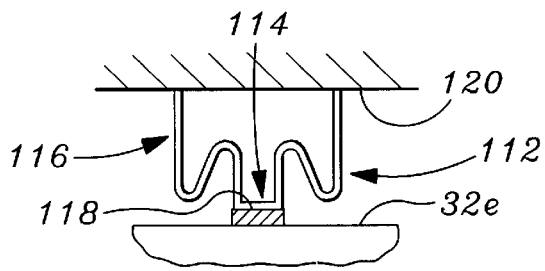

With reference to FIG. 15, a motion mechanism 112 constructed in accordance with an additional embodiment of the invention is shown. The motion mechanism 112 is the same as the motion mechanism 100 described above, except its orientation is reversed. The motion mechanism 112 includes a main body portion 114 and a pair of leg portions 116. The main body portion 114 includes a flat plate 118 that rests upon the support 32e. The flat plate 118 is connected to the support 32 with a threaded fastener or similar fastening means. The leg portions 116 have a sinusoidal-like shape and terminate in respective flanges 120. The flanges 120 are connected to the underside of the seat assembly 34e with threaded fasteners or similar fastening means.

Figure 16:
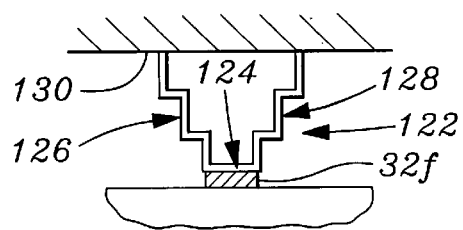

With reference to FIG. 16, a motion mechanism 122 constructed in accordance with an additional embodiment of the invention is shown. The motion mechanism 122 includes a main body portion 124 that rests upon the lateral support 32f. The main body portion 124 is attached to the lateral support 32f with threaded fasteners or similar fastening means. A pair of step-shaped leg portions 126, 128, respectively, extend from opposite sides of the main body portion 124. The step-shaped leg portions 126, 128 terminate in flanges 130. The flanges 130 support the seat assembly 34 and are connected thereto with threaded fasteners or similar fastening means.

Figure 17:
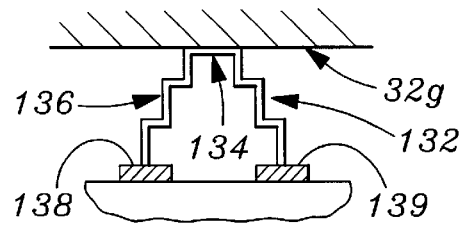

With reference to FIG. 17, a motion mechanism 132 constructed in accordance with an additional embodiment of the invention is shown. The motion mechanism 132 is the same as the motion mechanism 122 described above, except its orientation is reversed. The motion mechanism 132 includes a main body portion 134 that supports the seat assembly 32g. A pair of step-shaped leg portions 136 extend from opposite sides of the main body portion 134 and terminate in a pair of flanges 138. The flanges 138 rest upon a pair of lateral supports 139.

Figure 18:
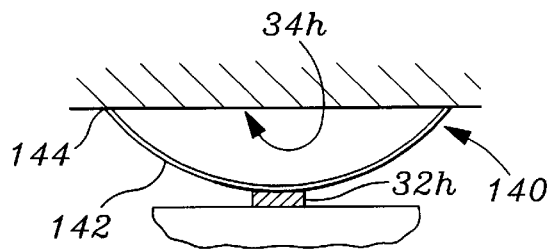

With reference to FIG. 18, a motion mechanism 140 constructed in accordance with an additional embodiment of the invention is shown. The motion mechanism 140 includes an elongated, upward-facing, arch-shaped member 142 or leaf spring that terminates at opposite ends in flanges 144. The flanges 144 support the seating assembly 34h and are connected thereto with threaded fasteners or similar fastening means. The motion mechanism 140 is connected to the lateral support 32h at its midpoint.

Figure 19:
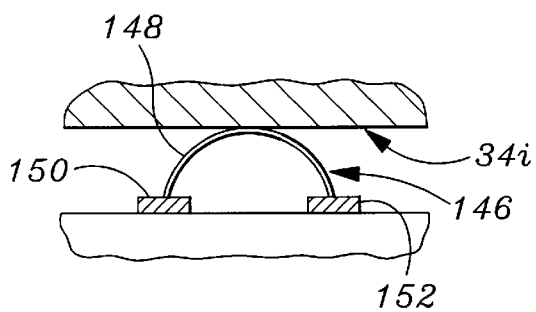

With reference to FIG. 19, a motion mechanism 146 constructed in accordance with an additional embodiment of the invention is shown. The motion mechanism 146 is similar to the motion mechanism 140 described above, except its orientation is reversed. The motion mechanism 146 includes an arch-shaped member 148 that terminates at opposite ends in flanges 150. The flanges 150 rest upon respective lateral supports 152 and are connected thereto. The arch-shaped member 148 is connected to seat assembly 34i at its apex.

The ideal location in the seat 20 for the occupant to sit is called the ischial tuberosities target area. This is the area of the seating assembly 34 where an occupant's ischial tuberosities ("seat bones") should be placed to obtain maximum comfort, optimal movement, and to obtain the greatest weight distribution benefit. This area is positioned approximately over the motion mechanism and extends longitudinally approximately the distance between the flanges or contact points between the motion mechanism and the seat assembly 34. The size of the ischial tuberosities target area depends on the size and construction of the motion mechanism. The ischial tuberosities target area ideally extends up to 5 in. longitudinally forward and rearward (10 in. total) from the point in the seating assembly over the center of the motion mechanism and can extend transversely as wide as the seating assembly 34.

The ischial tuberosities target area was much smaller in rocking seats of the past. Some of these seats included an arch-shaped assembly that attached to the seat at its apex. The apex narrowly defined the ischial tuberosities target area because an occupant had to be seated approximately directly over the apex to take full advantage of the comfort provided by the motion of the seat. This was sometimes difficult because every occupant has a different seating position. A number of the motion mechanism embodiments of the present invention (See FIGS. 11, 13, 15, 16, 18) expand the ischial tuberosities target area because they longitudinally extend the target area to approximately the distance between the flanges or contact points. The larger target area ensures that the occupant sits in the proper area of the seat to achieve maximum comfort and other benefits described above.

Figure 20:
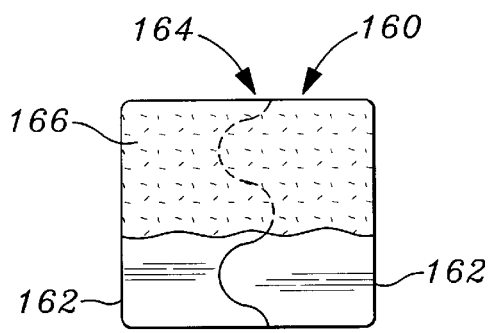
FIGS. 20–21 show a top plan view of alternative embodiments of the seat assemblies of the two platform motion seat of the present invention.
Figure 21:
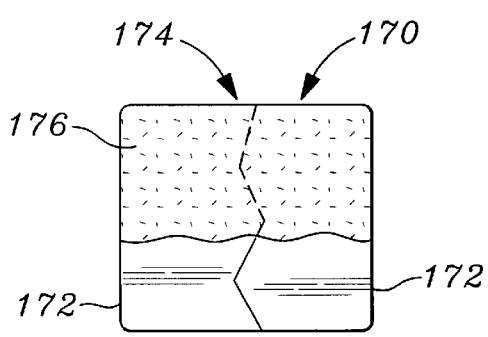

With reference to FIGS. 20 and 21, and initially to FIG. 20, a pair of seat assemblies, indicated generally by the reference numeral 160 and constructed in accordance with an alternative embodiment of the invention, will now be described. The seat assemblies device 160 consist of a pair of seat platforms 162 meshed or dove-tailed together at a mesh area 164. Although meshed together, the seat platforms 162 still rock, move vertically, and are provided at a neutral angle in the same manner as that described above. The mesh area 164 has a sinusoidal shape.

Both meshed seat platforms 162 are covered by a single cushion and/or upholstery 166. Meshing the seat platforms 162 and covering them with a single cushion and/or upholstery 166 still provides all the benefits described above relating to providing a neutral angle and two types of motion in the seat assemblies, and eliminates any demarcation or visible split between the seat assemblies. Eliminating this split makes the visible upper surface of the seat more aesthetically appealing, prevents crumbs and other debris from collecting in the crevice formed by this split, and prevents the occupant from getting his or her fingers, hands, arms, legs, or clothing caught in this area.

With reference to FIG. 21, an alternative embodiment of a pair of seat assemblies 170 is shown. The seat assemblies 170 consist of a pair of seat platforms 172 that are meshed or dove-tailed together at a mesh area 174. The mesh area 174 has a toothed design. The seat platforms also may be covered by a single cushion and/or upholstery 176.

It should be noted, in another embodiment of the invention, the seat platforms 36 illustrated in FIG. 2 may be covered with a single cushion and/or upholstery 166 to provide the advantages mentioned above. This construction may provide more of a demarcation between the seat platforms 36 than the dove-tailed seats 160, 170, but still makes the visible upper surface of the seat more aesthetically appealing, prevents crumbs and other debris from collecting in the crevice formed by a split seat assembly, and prevents the occupant from getting his or her fingers, hands, arms, legs, or clothing caught in this area.

Although this invention has been described in terms of certain preferred embodiments, other embodiments apparent to those of ordinary skill in the art are also within the scope of this invention. Accordingly, the scope of the invention is intended to be defined only by the claims that follow.

What is claimed is:

1. A seat comprising:
   a pair of seating bodies, at least one motion mechanism providing the seating bodies with a total rocking motion and a vertical motion, each seating body having a predetermined neutral angle based on the particular application of the seat, wherein the neutral angle is the angle with respect to a horizontal axis orthogonal to the earth's gravity vectors that the seating body resides at when no external forces are present on the seating body.

2. The seat of claim 1, wherein the neutral angle ranges between approximately negative 40 degrees and positive 30 degrees.

3. The seat of claim 1, wherein the amount of vertical motion ranges between approximately 0.1 and 4 inches.

4. The seat of claim 1, wherein the seating body can rock through an angle of up to approximately 60 degrees.

5. The seat of claim 1, wherein the neutral angle is between approximately 0 and positive 4 degrees, the amount of vertical motion is between approximately 0.10 and 1.5 inches, and the total rocking motion is between approximately 5 and 10 degrees.

6. The seat of claim 1, wherein the neutral angle is between approximately 0 and positive 15 degrees, the amount of vertical motion is between approximately 0.25 and 2.0 inches, and the total rocking motion is between approximately 3 and 20 degrees.

7. The seat of claim 1, wherein the neutral angle is between approximately 0 and positive 30 degrees, the amount of vertical motion is approximately between 0.5 and 4.0 inches, and the total rocking motion is approximately between 10 and 60 degrees.

8. The seat of claim 1, wherein the neutral angle is between approximately 0 and negative 40 degrees, the amount of vertical motion is approximately between 0.1 and 1.5 inches, and the total rocking motion is approximately between 10 and 60 degrees.

9. The seat of claim 1, wherein said motion mechanism provides an ischial tuberosities target area, said ischial tuberosities target area defined as the ideal location on the seating body for an occupant to sit, the ischial tuberosities target area extending about 5 inches in the longitudinal direction of the seating body forward of and about 5 inches rearward of said motion mechanism and up to the width of the seating body.

10. The seat of claim 1, wherein a predetermined amount of rocking motion and vertical motion are provided in each seating body based on the neutral angle.

11. The seat of claim 10, wherein the total rocking motion is greater when the neutral angle, positive or negative, is greater.

12. The seat of claim 10, wherein the vertical motion is greater when the neutral angle is positive and greater, and the vertical motion is less when the neutral angle is negative and greater.

13. The seat of claim 1, wherein said seating bodies are covered by a single cushion.

14. The seat of claim 13, wherein said seating bodies are meshed.

15. The seat of claim 1, wherein the seating bodies move independently of each other.

16. The seat of claim 1, wherein each seating body is subdivided into at least two movable subportions.

17. The seat of claim 1, wherein each seating body is adjustable to provide multiple neutral angles.

18. A seat for optimally distributing the weight of an occupant's body borne by the ischial tuberosities and posterior over the seat regardless of an occupant's seating position, the seat comprising:
   a pair of seating assemblies, each seating assembly including a seat base, a cushion material supported by the base, and a cover for protecting the seating assembly;
   at least one support that supports said seating assemblies;
   at least one motion mechanism disposed between said at least one support and said seating assemblies, said at least one motion mechanism providing said seating assemblies with rocking movement and vertical movement;
   each seating assembly having (I) a predetermined neutral angle based on the particular application of the seat, wherein the neutral angle is the angle with respect to a horizontal axis orthogonal to earth's gravity vectors that the seating assembly naturally resides at when no external forces are present on the seating assembly; and (ii) a predetermined amount of total rocking motion and vertical motion provided in each seating assembly based on the neutral angle.

19. The seat of claim 18, wherein the neutral angle ranges between approximately negative 40 degrees and positive 30 degrees.

20. The seat of claim 18, wherein the amount of vertical motion ranges between approximately 0.1 and 4 inches.

21. The seat of claim 18, wherein the seating assembly can rock through an angle of up to approximately 60 degrees.

22. The seat of claim 18, wherein the neutral angle is between approximately 0 and positive 4 degrees, the amount of vertical motion is between approximately 0.10 and 1.5 inches, and the total rocking motion is between approximately 5 and 10 degrees.

23. The seat of claim 18, wherein the neutral angle is between approximately 0 and positive 15 degrees, the amount of vertical motion is between approximately 0.25 and 2.0 inches, and the total rocking motion is between approximately 3 and 20 degrees.

24. The seat of claim 18, wherein the neutral angle is between approximately 0 and positive 30 degrees, the amount of vertical motion is approximately between 0.5 and 4.0 inches, and the total rocking motion is approximately between 10 and 60 degrees.

25. The seat of claim 18, wherein the neutral angle is between approximately 0 and negative 40 degrees, the amount of vertical motion is approximately between 0.1 and 1.5 inches, and the total rocking motion is approximately between 10 and 60 degrees.

26. The seat of claim 18, wherein said motion mechanism provides an ischial tuberosities target area, said ischial tuberosities target area defined as the ideal location in the seating assembly for an occupant to sit, the ischial tuberosities target area extending about 5 inches in the longitudinal direction of the seating assembly forward of and about 5 inches rearward of said motion mechanism and up to the width of the seating assembly.

27. The seat of claim 18, wherein the total rocking motion is greater when the neutral angle, positive or negative, is greater.

28. The seat of claim 18, wherein the vertical motion is greater when the neutral angle is positive and greater, and the vertical motion is less when the neutral angle is negative and greater.

29. The seat of claim 18, wherein said seating assemblies are covered by a single cushion.

30. The seat of claim 29, wherein said seating assemblies are meshed.

31. The seat of claim 18, wherein the seating bodies move independently of each other.

32. The seat of claim 18, wherein each seating body is subdivided into at least two movable subportions.

33. The seat of claim 18, wherein each seating assembly is adjustable to provide multiple neutral angles.

34. A seat comprising:
   a pair of seating assemblies, each seating assembly including a seat base, a cushion material supported by said seat base, and a cover which protects said cushion material and seat base;
   at least one support that supports said seating assemblies;
   at least one motion mechanism disposed between the seating assembly and the at least one support, said at least one motion mechanism providing rocking motion and vertical motion in said seating assemblies and an enlarged ideal sitting area for an occupant's ischial tuberosities;
   each seating assembly having a predetermined neutral angle based on the application of the seat, wherein the neutral angle is the angle with respect to a horizontal axis orthogonal to earth's gravity vectors that the seating assembly resides at when no external forces are present on the seating assembly, a predetermined amount of total rocking motion and vertical motion provided in each seating assembly based on the neutral angle.

35. The seat of claim 34, wherein the neutral seating angle ranges between approximately negative 40 degrees and positive 30 degrees.

36. The seat of claim 34, wherein the amount of vertical motion ranges between approximately 0.1 and 4 inches.

37. The seat of claim 34, wherein the amount of vertical motion is at least approximately 0.8 inches.

38. The seat of claim 34, wherein the seating assembly can rock through an angle of up to approximately 60 degrees.

39. The seat of claim 34, wherein the neutral angle is between approximately 0 and positive 4 degrees, the amount of vertical motion is between approximately 0.10 and 1.5 inches, and the total rocking motion is between approximately 5 and 10 degrees.

40. The seat of claim 34, wherein the neutral angle is between approximately 0 and positive 15 degrees, the amount of vertical motion is between approximately 0.25 and 2.0 inches, and the total rocking motion is between approximately 3 and 20 degrees.

41. The seat of claim 34, wherein the neutral angle is between approximately 0 and positive 30 degrees, the amount of vertical motion is approximately between 0.5 and 4.0 inches, and the total rocking motion is approximately between 10 and 60 degrees.

42. The seat of claim 34, wherein the neutral angle is between approximately 0 and negative 40 degrees, the amount of vertical motion is approximately between 0.1 and 1.5 inches, and the total rocking motion is approximately between 10 and 60 degrees.

43. The seat of claim 34, wherein said ideal sitting area is defined as the ideal location in the seating assembly for an occupant to sit, the ideal sitting area extending up to 5 inches in the longitudinal direction of the seating assembly forward of and about 5 inches rearward of said motion mechanism and up to the width of the seating assembly.

44. The seat of claim 34, wherein the total rocking motion is greater when the neutral angle, positive or negative, is greater.

45. The seat of claim 34, wherein the vertical motion is greater when the neutral angle is positive and greater, and the vertical motion is less when the neutral angle is negative and greater.

46. The seat of claim 34, wherein said seating assemblies are covered by a single cushion.

47. The seat of claim 46, wherein said seating assemblies are meshed.

48. The seat of claim 34, wherein the seating assemblies move independently of each other.

49. The seat of claim 34, wherein each seating assembly is subdivided into at least two movable subportions.

50. The seat of claim 34, wherein each seating assembly is adjustable to provide multiple neutral angles.

51. A seat comprising:

a pair of seating assemblies, at least one motion mechanism providing the seating assemblies with a rocking motion and a vertical motion, each seating assembly having a neutral angle, which is a non-zero angle that the seating assembly resides at with respect to a predefined axis when no external forces are present on the seat, the neutral angle ranging between approximately negative 40 degrees and positive 30 degrees, a predetermined amount of vertical motion and total rocking motion provided in each seating assembly based on the neutral angle of the seating assemblies, the amount of vertical motion ranging between approximately 0.1 and 4 inches, and the amount of total rocking motion being up to approximately 60 degrees.

52. A seat comprising:

a pair of seating bodies, each having a ischial tuberosities target area extending about 5 inches in the longitudinal direction of the seating body forward of and about 5 inches rearward of said motion mechanism and up to the width of the seating body;

a pair of motion mechanisms, each respectively associated with one seating body, each motion mechanism providing its respective seating body with a rocking motion and a vertical motion, and each motion mechanism having at least two points of physical contact with its associated seat body.

* * * * *